United States Patent Office 3,637,833
Patented Jan. 25, 1972

3,637,833
PREPARATION OF CARBOXYLIC ACIDS
Donald M. Fenton, Anaheim, Calif., assignor to Union
Oil Company of California, Los Angeles, Calif.
No Drawing. Filed Dec. 21, 1967, Ser. No. 692,262
Int. Cl. C07c 53/22
U.S. Cl. 260—533 A       10 Claims

ABSTRACT OF THE DISCLOSURE

A process for preparation of carboxylic acids comprising reacting an olefin, carbon monoxide and water in the presence of hydrogen and a catalyst comprising rhodium.

---

Preparation of carboxylic acids having from 3 to about 20, or more, carbon atoms by reaction of olefins with carbon monoxide and water is conventional and is disclosed in numerous patents, e.g., U.S. Pat. 2,593,440. The acids find utility in preparation of a wide variety of products, such as emulsifying agents, electroplating solutions, perfume esters, artificial flavors, solvent mixtures, pharmaceuticals, etc. A wide variety of catalysts have been employed in the reaction, including noble metals such as rhodium. It has now been found, according to the present invention, that the effectiveness of rhodium as a catalyst in the reaction is greatly enhanced by addition of hydrogen to the reaction medium. The hydrogen apparently acts as a cocatalyst and results in substantially improved yields of the carboxylic acid.

The olefin may be either an aliphatic olefin or a cycloolefin having from about 2 to about 24 carbons, preferably from 2 to about 18 carbons. It may be any of the following:

(1) ethylene and substituted ethylenes such as:

wherein $R_1$, $R_2$, $R_3$ and $R_4$ are hydrogen, alkyl, cycloalkyl, aryl, alkaryl, aralkyl, alkenyl aryl, hydroxy, hydroxy alkyl, hydroxy aryl, etc.;

(2) cycloalkenes and substituted cycloalkenes such as:

wherein $R_1$ and $R_2$ are as previously mentioned and $R_5$ is an alkylene or isoalkylene group having from 2 to about 6 carbons.

Examples of useful olefins are the hydrocarbon olefins such as ethylene, propylene, butene-1, butene-2, pentene-2, 2-methylbutene-1, hexene-1, 3-ethylhexene-1, octene-3, 2-propylhexene-1, decene-2, 4,4′-dimethylnonene-1, dodecene-1, 6-propyldecene-1, tetradecene-5, 5-amyldecene-3, hexadecene-1, 4-ethyltridecene-2, octadecene-1, 5,5-dipropyldodecene-3, eicosene-7, etc. Of these the aliphatic hydrocarbon olefins having from about 2 to 18 carbons are preferred and most preferred are the alpha olefins having terminally unsaturated carbons. Choice of the particular olefin depends of course on the desired product.

Other olefins that can be used include vinyl cyclohexane, allylcyclohexane, styrene, p-methylstyrene, alpha-methylstyrene, beta-methylstyrene, p-vinylcumene, beta-vinylnaphthalene, 1,2-diphenylethylene, allylbenzene, 6-phenylhexene-1, 1,3-diphenylbutene-1, vinyl-p-xylene, divinylbenzene, 1-allyl-4-vinylbenzene, allyl carbinol, beta-allylethyl alcohol, allylmethylpropylcarbinol, allylphenol, etc.

Cycloalkenes and their substituted derivatives include cyclobutene, cyclopentene, cyclohexene, methylcyclohexene, amylcyclopentene, cycloheptene, cyclooctene, cyclodecene, etc.

The rhodium catalyst can be added to the reaction medium as a soluble salt, as a carbonyl compound or as a chelate. Examples of suitable salts are rhodium chloride, rhodium acetate, rhodium nitrate, rhodium bromide, etc. Examples of suitable chelates are rhodium acetyl acetonate and complexes of rhodium ion with such conventional chelating agents as ethylene diamine tetraacetic acid and its alkali metal salts, citric acid, etc.

When the rhodium is employed in the form of a salt it is believed that a carbonyl complex is formed in situ by reaction with the carbon monoxide reactant. The carbonyl complex may, however, also be formed externally and introduced into the reaction mixture as such.

A catalytic quantity of the rhodium-containing catalyst is used. This is generally an amount sufficient to provide a concentration of rhodium which is between about 0.002 and about 2.0 weight percent of the liquid reaction medium and preferably between about 0.05 and about 0.5 weight percent.

The reaction is performed under liquid phase conditions and the reaction solvent may be water alone or a mixture of water and an organic solvent. Any conventional organic solvent that is inert to the reactants, the catalyst and the products, and which is miscible with water, may be used in combination with the water. Suitable solvents include ethers, esters, etc. Particularly effective solvents are fatty carboxylic acids of about 1 to 20 carbon atoms, including the acid that is to be prepared by the process of the invention. It has also been found that a further increase in acidity of the reaction mixture, e.g., down to a pH of about 1, may result in increased yield of certain acids. This increased acidity may be readily achieved by addition of a mineral acid, such as hydrochloric acid.

The reaction is performed under relatively mild conditions including temperatures from about 50° to about 250° C.; preferably from about 70° to about 175° C. Sufficient pressure is used to maintain the reaction medium in liquid phase. Although atmospheric pressure can be used, the rate of reaction is increased by superatmospheric pressures and, therefore, pressures from about 5 to about 300 atmospheres and preferably from about 10 to about 100 atmospheres are used.

Proportions of the reactants are not critical, although certain proportions may be optimum for a given olefin, catalyst and solvent. These are best determined empirically. In general, the amount of CO, based on the moles of olefin, will range from about 0.1 to 10 mol percent, the amount of hydrogen will range from about 0.1 to 100 mole percent and the amount of water will range from about 0.1 to 10 mole percent. Water should be present in an amount ranging from about 5% to 100% of the liquid phase.

The reaction conditions are maintained by conventional means. The pressure can be maintained by the pressure of the gases supplied to the reaction zone. If desired, however, a suitable inert gas, such as nitrogen, can also be charged to the reaction zone.

The product acids may be readily separated from the reaction mixture by conventional means such as fractional distillation, chromatography, extraction, etc.

The invention is more specifically illustrated by the following examples:

EXAMPLE 1

To 25 ml. conc. hydrochloric acid, 75 ml. acetic acid, and ⅓ g. rhodium trichloride in a tantalum lined steel bomb of 300 ml. capacity were added ethylene to 300 p.s.i. and carbon monoxide to 800 p.s.i. The mixture was rocked and heated to 100° C. for 2 hours and 175° C. for 2 hours. There was isolated some 2 g. of propionic acid.

EXAMPLE 2

To ⅓ g. rhodium trichloride, 25 ml. conc. hydrochloric acid and 75 ml. acetic acid in the above described bomb were added ethylene to 400 p.s.i., carbon monoxide to 800 p.s.i. and hydrogen to 1400 p.s.i. The mixture was rocked and heated to 120° C. for 4 hours. There was isolated 17 g. of propionic acid.

EXAMPLE 3

Under the same conditions as Example 2 except that 400 p.s.i. of ethylene, 200 p.s.i. of carbon monoxide and 400 p.s.i. of hydrogen were used, there was found 9.5 g. of propionic acid.

I claim:

1. A process for preparation of carboxylic acids comprising contacting an olefin having from 2 to about 18 carbon atoms, carbon monoxide and water in the presence of (1) from about 0.002 to 2 weight percent of a rhodium soluble salt, carbonyl, or chelate catalyst and (2) from about 0.1 to about 100 mole percent of molecular hydrogen in an amount sufficient to enhance the catalytic activity of the rhodium catalyst; said contacting being conducted at a temperature of from about 50° to about 250° C. and a pressure of from 10 to 100 atmospheres.

2. The process of claim 1 in which the olefin is ethylene and the product is propionic acid.

3. The process of claim 1 in which the rhodium is added to the reaction mixture in the form of a salt.

4. The process of claim 3 in which the rhodium salt is rhodium trichloride.

5. The process of claim 1 in which the hydrogen is added to a pressure of from about 100 to 1000 p.s.i.

6. The process of claim 1 in which the reaction medium also comprises an organic solvent.

7. The process of claim 6 in which the organic solvent is a $C_1$ to $C_{20}$ fatty carboxylic acid.

8. The process of claim 7 in which the fatty carboxylic acid is acetic acid.

9. The process of claim 1 in which the pH of the reaction mixture is lowered by addition of a mineral acid.

10. The process of claim 9 in which the mineral acid is hydrochloric acid.

References Cited

UNITED STATES PATENTS

| | | | |
|---|---|---|---|
| 2,739,169 | 3/1956 | Hagemeyer | 260—533 AX |
| 3,020,314 | 2/1962 | Alderson | 260—533 AX |
| 3,064,040 | 11/1962 | Klemchuk | 260—533 AX |
| 3,349,119 | 10/1967 | Fenton et al. | 260—533 AX |
| 3,455,989 | 7/1969 | Kutepow et al. | 260—533 AX |

LORRAINE A. WEINBERGER, Primary Examiner

R. D. KELLY, Assistant Examiner

U.S. Cl. X.R.

260—413, 514 C, 515 R